United States Patent
Coutts

(10) Patent No.: US 9,921,729 B2
(45) Date of Patent: *Mar. 20, 2018

(54) MULTI-CONVERSATION INSTANT MESSAGING

(71) Applicant: Daryl David Coutts, Calgary (CA)

(72) Inventor: Daryl David Coutts, Calgary (CA)

(73) Assignee: Marengo Intellectual Property Ltd., Calgary (CA)

( * ) Notice: Subject to any disclaimer, the term of this patent is extended or adjusted under 35 U.S.C. 154(b) by 221 days.

This patent is subject to a terminal disclaimer.

(21) Appl. No.: 14/330,018

(22) Filed: Jul. 14, 2014

(65) Prior Publication Data

US 2014/0325397 A1 Oct. 30, 2014

Related U.S. Application Data

(63) Continuation of application No. 11/822,453, filed on Jul. 6, 2007, now Pat. No. 8,782,133.

(60) Provisional application No. 60/830,141, filed on Jul. 12, 2006, provisional application No. 60/838,187, filed on Aug. 17, 2006.

(51) Int. Cl.
| | | |
|---|---|---|
| *G06F 15/16* | (2006.01) | |
| *G06F 3/00* | (2006.01) | |
| *G06F 3/0484* | (2013.01) | |
| *G06Q 10/10* | (2012.01) | |
| *H04L 12/58* | (2006.01) | |

(52) U.S. Cl.
CPC ....... *G06F 3/04842* (2013.01); *G06Q 10/107* (2013.01); *H04L 51/04* (2013.01)

(58) Field of Classification Search
CPC ..... G06F 3/048; G06F 3/04842; G06F 3/0486
USPC .................. 709/204, 206; 715/751, 753, 758
See application file for complete search history.

(56) References Cited

U.S. PATENT DOCUMENTS

| | | | | |
|---|---|---|---|---|
| 7,003,308 | B1 * | 2/2006 | Fuoss et al. .................. | 455/466 |
| 7,653,693 | B2 * | 1/2010 | Heikes et al. ................ | 709/206 |
| 7,818,379 | B1 * | 10/2010 | Heikes et al. ................ | 709/206 |
| 2005/0193345 | A1 * | 9/2005 | Klassen et al. .............. | 715/751 |
| 2006/0174207 | A1 * | 8/2006 | Deshpande ................... | 715/758 |
| 2007/0180040 | A1 * | 8/2007 | Etgen et al. .................. | 709/207 |

* cited by examiner

*Primary Examiner* — Tonia L Dollinger
*Assistant Examiner* — Adam Cooney

(57) ABSTRACT

A method for facilitating multiple simultaneous instant messaging conversations includes: receiving a first online instant message from a first instant messaging conversation, where the user is a participant in the first instant messaging conversation; receiving a second online instant message from a second instant messaging conversation, in which the user is also a participant; integrating the first online instant message and the second online instant message into a sequence of instant messages; and displaying the sequence of instant messages such that the more recently received instant messages are displayed either below or above less recently received instant messages. If the user directs input at the displayed sequence of messages, a second sequence of messages primarily comprising messages from the first instant messaging conversation is displayed.

3 Claims, 8 Drawing Sheets

MULTI-CONVERSATION INSTANT MESSAGING

CLAIM OF PRIORITY

This application claims priority to and is a continuation of U.S. patent application Ser. No. 11/822,453 filed Jul. 6, 2007, and titled "Multi-conversation Instant Messaging", which claims priority under 35 USC § 119(e) to U.S. Provisional Application Ser. No. 60/830,141, filed on Jul. 12, 2006, entitled "Multi-conversation Sequence" and to U.S. Provisional Application Ser. No. 60/838,187, filed on Aug. 17, 2006, entitled "Multi-conversation Instant Messaging", the entire contents of each application is hereby incorporated by reference.

TECHNICAL FIELD

This invention pertains to computerized methods and systems for displaying instant messaging conversations on a computer display.

BACKGROUND OF THE INVENTION

Instant messaging is used more and more in online dating, business communications, social networking, and various other forums. Users of instant messaging often have two, three, or more independent conversations simultaneously, in fact, in online dating it is not uncommon for user to have four or more simultaneous instant messaging conversations. Each instant messaging conversation has a dedicated pane on the user's computer screen. While a user is focused on one conversation pane, they receive instant messages in the other conversation panes. The user is notified of these other instant messages by a flashing icon at the bottom of their computer screen or sometimes by a transitory pop-up in the corner of their computer screen. These transitory notifications let the user know that they have received a new instant message and may provide a snippet of the received instant message. Users must divert their attention from the conversation pane they are currently focused on and check the other conversation panes to read the new instant messages. This checking of conversation panes is a diversion and reduces the user's ability to hold multiple independent conversations.

Some instant messaging applications use horizontal ticker panes to display instant messages. Ticker panes repeat instant messages periodically to increase the chance that a user will see the notification, but unless the user is looking at the ticker pane when a particular instant message goes by, they will miss it. Another drawback with ticker panes is that because they repeat instant messages periodically, old instant messages are sometimes displayed next to new instant messages. This lack of time order, in instant message display, makes review of previous instant messages difficult. Also, user scrolling of the horizontal ticker pane for instant message review is an unnatural user interface action and therefore it is uncomfortable for users to review instant messages in a horizontal ticker pane.

What is needed is a system and method that integrates instant messages from different conversations into a single multi-conversation sequence of instant messages and then displays the multi-conversation sequence of instant messages in a user friendly, one above the other format. Accordingly, the screen area required to monitor many instant messaging conversations is substantially reduced. Further, presence notifications can also be integrated into the multi-conversation sequence of instant messages. Still further, the system and methods can facilitate easy focus switching from a multi-conversation sequence of instant messages to a single conversation sequence of instant messages.

BRIEF SUMMARY OF THE INVENTION

According to one embodiment, a method of the invention is implemented in an instant messaging application executing on a computing device associated with a user. A first online instant message from a first instant messaging conversation is received and a second online instant message from a second instant messaging conversation is received. The user is a participant in both the first and second instant messaging conversations. The first online instant message and the second online instant message are integrated into a first sequence of instant messages. The first sequence of instant messages is displayed on a display associated with the computing device. In the displaying of the first sequence of instant messages, more recently received instant messages are displayed below less recently received instant messages in the plane of the display. Alternatively, more recently received instant messages are displayed above less recently received instant messages in the plane of the display.

If the user wishes to respond to a particular instant message, the user can click on a first online instant message in the displayed first sequence of instant messages. The clicking action by the user initiates the display of a second sequence of instant messages. The second sequence of instant messages primarily comprises instant messages from the first instant messaging conversation.

The first sequence of instant messages can be half duplex (comprising primarily incoming online instant messages) or it can be full-duplex (comprising both incoming and outgoing online instant messages).

Presence notifications can be integrated into the first sequence of instant messages. It should also be noted that instant messages received over different instant messaging services can be integrated into the first sequence of instant messages. In an alternative embodiment, the integration of online instant messages into the first sequence of instant messages and the display of the first sequence of instant messages may be provided by an application different than the instant messaging application.

The people the user is conversing with may not even be aware that their online instant messages have been integrated into the first sequence of instant messages.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
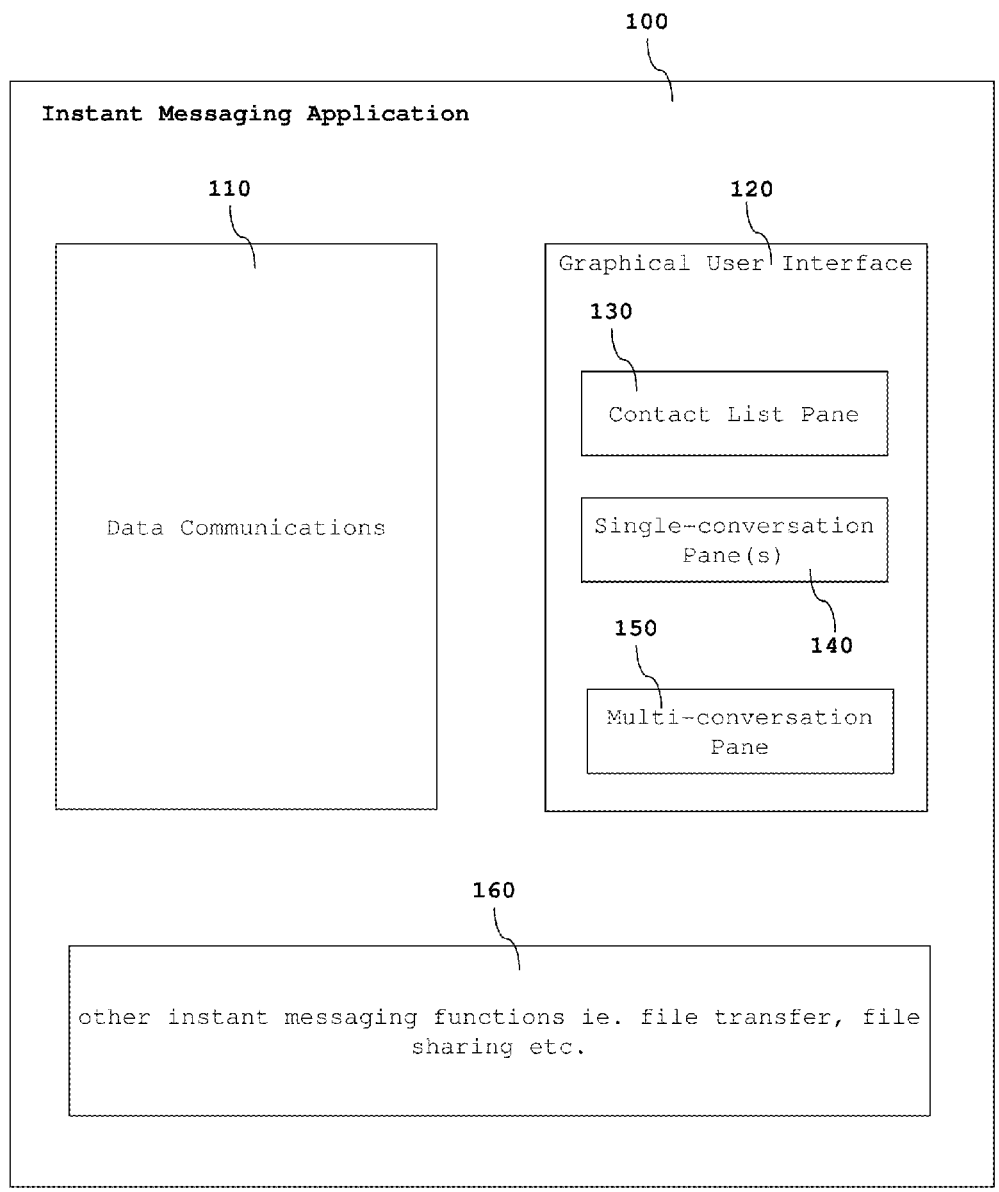
FIG. 1 is an example of a block diagram of an instant messaging application.

FIG. 1 shows a block diagram of an instant messaging application 100 that executes on a computing device 220. 110 is the data communications module of the instant messaging application which formats the incoming and outgoing instant messages according to the particular instant messaging protocol. The instant messaging application 100 is capable of sending instant messages. 120 represents a user interface module that comprises a contact list pane 130, one or more single conversation panes 140 and a multi-conversation pane 150. A single conversation pane 140 is a display area for a sequence of instant messages where the sequence contains instant messages from primarily a single conversation. A multi-conversation pane 150 is a display area for a sequence of instant messages, where the sequence comprises instant messages from plural instant messaging conversations. 160 represents other instant messaging functionality's such as file transfer, file sharing and the like. FIG. 1 is an example only—the modules could be grouped together differently, modules could be removed and modules could be added.

Figure 2:
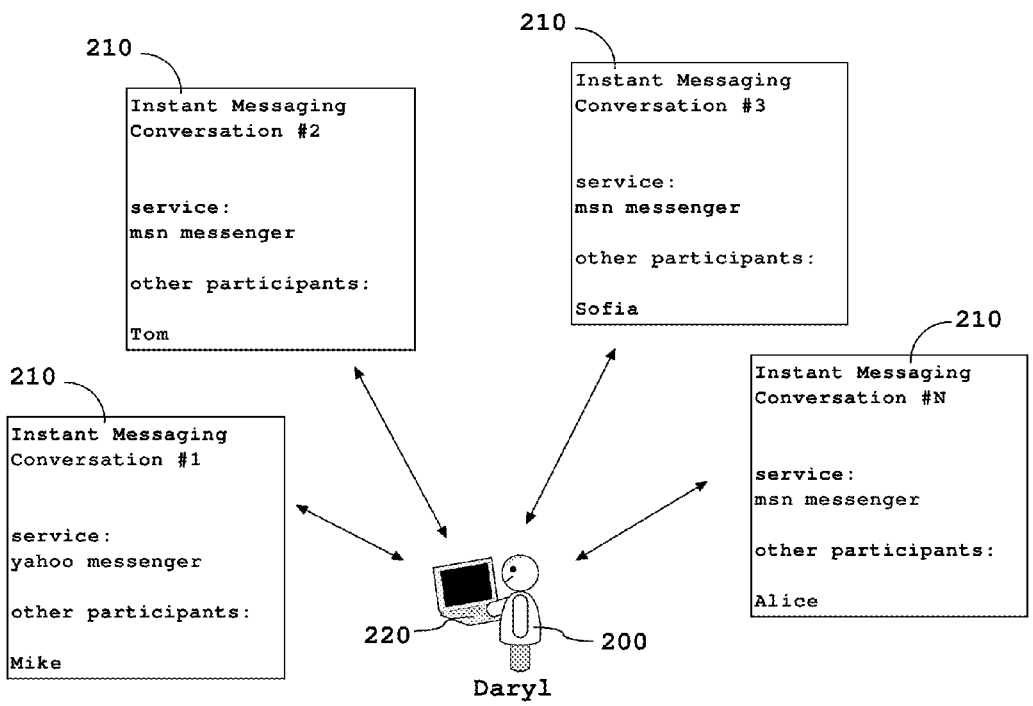
FIG. 2 illustrates a user in four independent exemplary instant messaging conversations.

FIG. 2 shows a user 200 "Daryl" associated with a computing device 220, such as a laptop computer, a personal digital assistant, a cell phone, or any other computing device. 210 represents an instant messaging conversation. The user 200 is shown participating in four instant messaging conversations 210, but of course the user 200 could participate in any number of instant messaging conversations 210. Only two participants are shown in each instant messaging conversation represented in FIG. 2, but there could be more than two participants in a particular instant messaging conversation 210.

For the purposes of this document, an offline instant message refers to one (or both) of two types of instant messages. The first type of offline instant message is an instant message that is sent to a conversation participant who is not signed in to the corresponding instant messaging service at the time the instant message is originated. The second type of offline instant message is an instant message received from a sender who is not on the contact list (or similar list) of the receiver. Also for the purposes of this document, an online instant message is an instant message that is not an offline instant message.

Figure 3A:
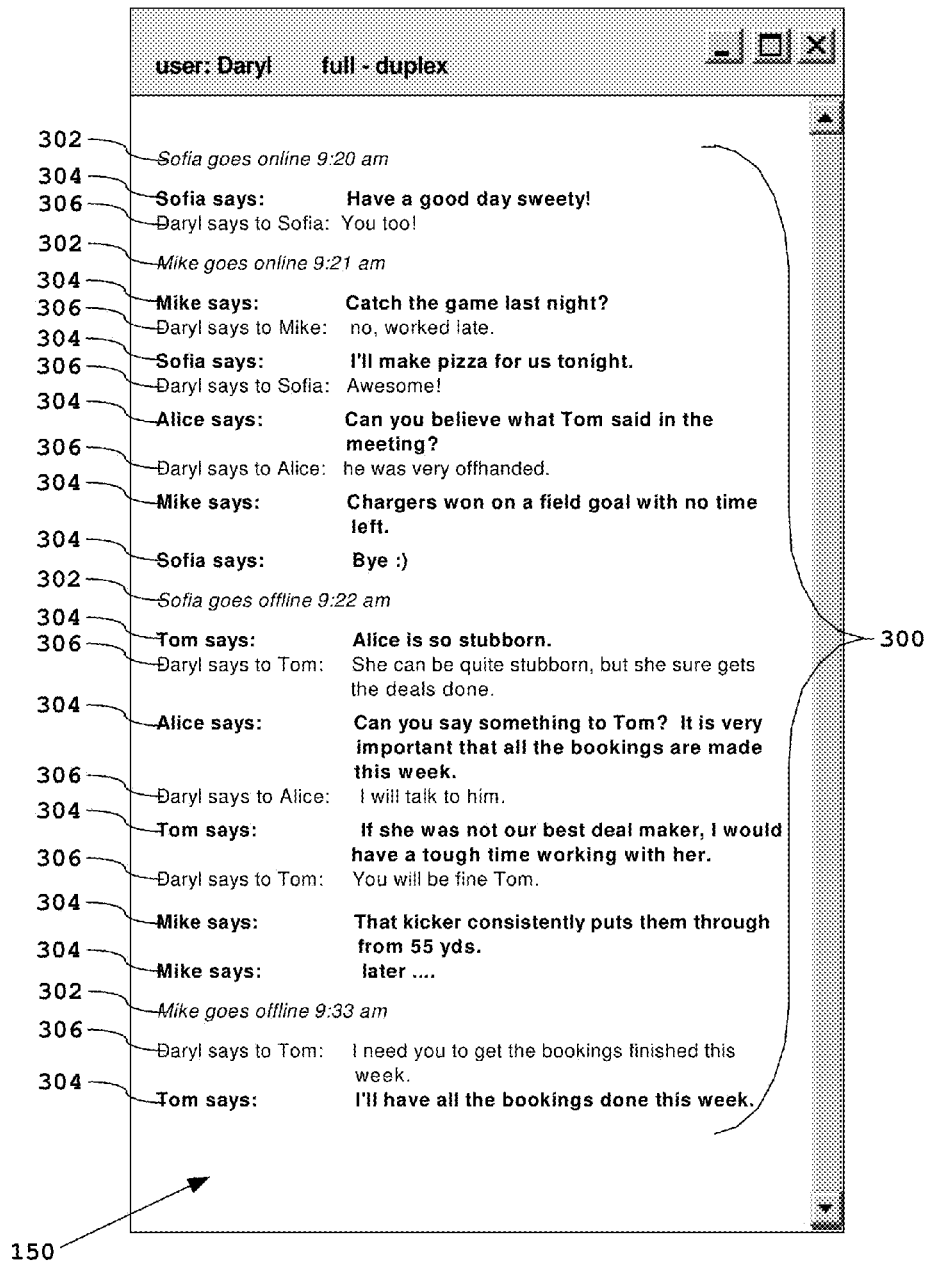
FIG. 3a illustrates a displayed first sequence of instant messages full-duplex mode.

FIG. 3a shows a multi-conversation pane 150, part of a graphical user interface 120 to a instant messaging application 100 executing on a computing device 220, the user 200 Daryl associated with the computing device 220, has four separate instant messaging conversations 210 going: one conversation 210 with his girlfriend Sofia, one conversation 210 with his friend Mike, one conversation 210 with a business associate Alice, and one conversation 210 with another business associate Tom. In these examples, there are only two participants in each conversation 210 and in each conversation the user 200 Daryl is a participant. It is possible to have more than two participants in a particular conversation 210. Incoming online instant messages 304 from plural instant messaging conversations 210 are integrated into a sequence of instant messages 300. Outgoing online instant messages 306 can also be integrated into the sequence of instant messages 300. When both incoming online instant messages 304 and outgoing online instant messages 306 are integrated into the sequence of instant messages 300, this is referred to as a full duplex sequence of instant messages 300. Presence notifications 302 can also be integrated into the sequence of instant messages 300. The displaying of the sequence of instant messages 300 can be enhanced by including icons, emoticons, and specialized text formatting. In this embodiment, the sequence of instant messages 300 is displayed within a multi-conversation pane 150, other ways of displaying the sequence of instant messages 300 are possible and fit within the scope of the invention.

Figure 3B:
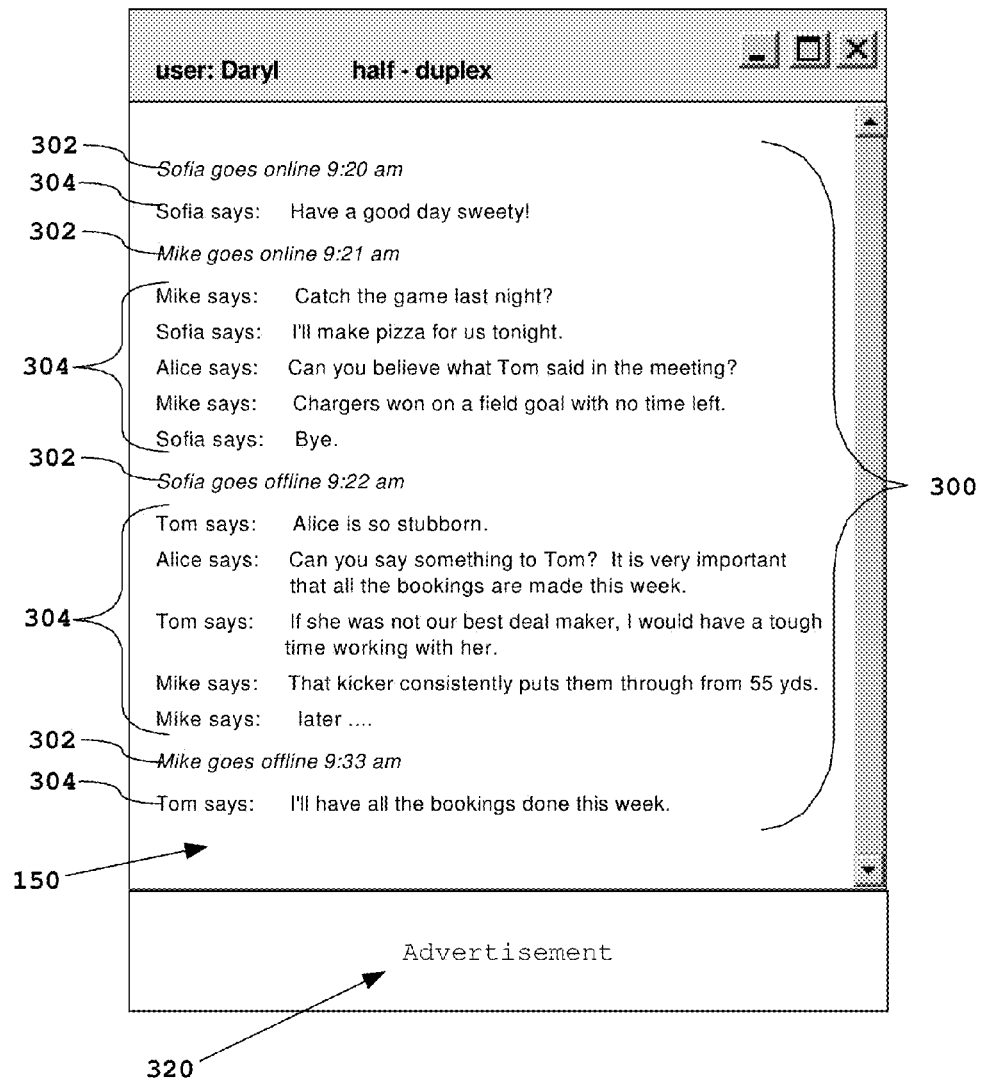
FIG. 3b illustrates a displayed first sequence of instant messages half-duplex mode.

FIG. 3b shows the display of a half-duplex sequence of instant messages 300. Half-duplex refers to the exclusion of outgoing online instant messages 306 from the sequence of instant messages 300. FIG. 3b shows the same example conversations 210 as FIG. 3a. FIG. 3b also shows that an advertisement 320 can be displayed nearby the displayed sequence of instant messages 300.

Figure 4:
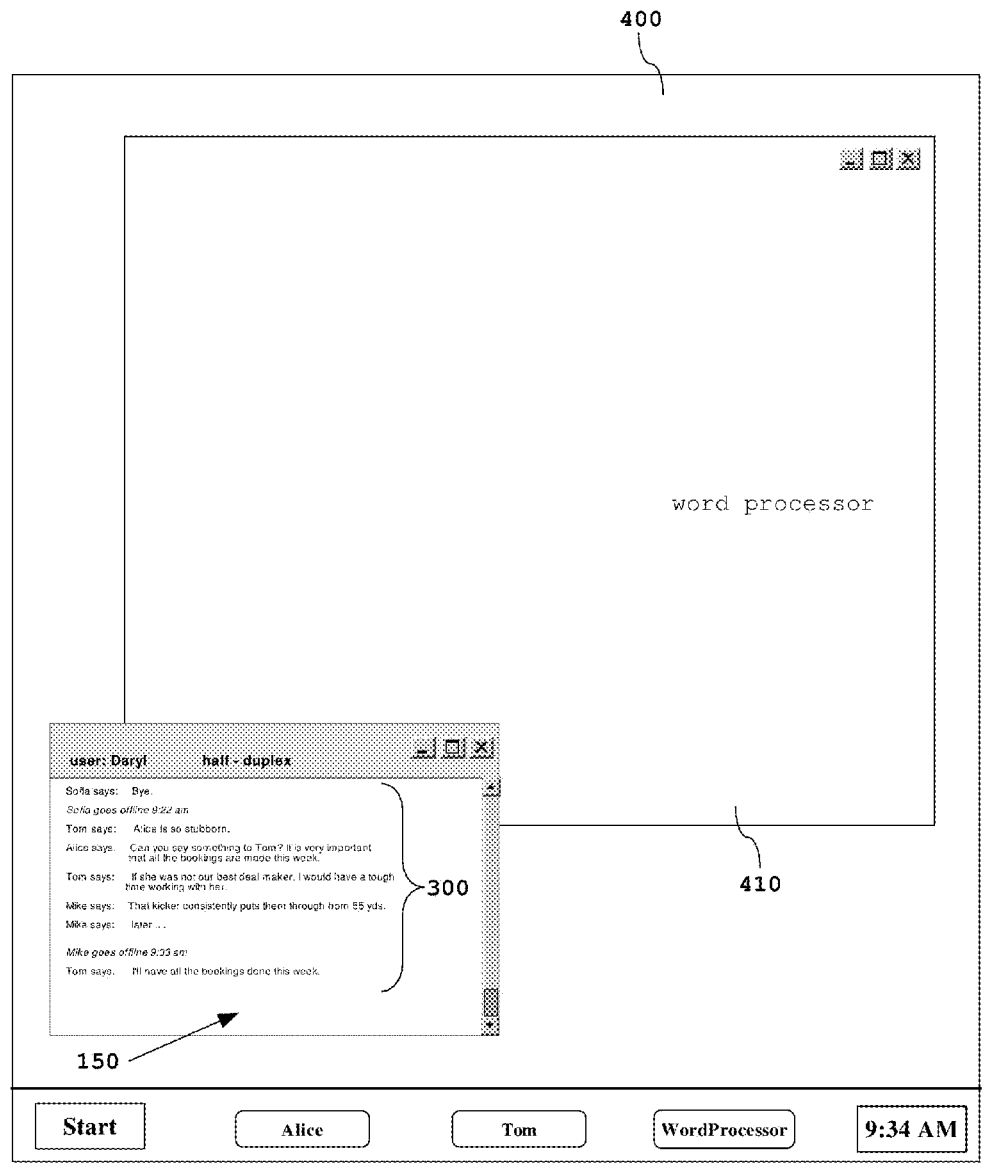
FIG. 4 illustrates an exemplary first sequence of instant messages displayed on a computer display.

FIG. 4 illustrates an exemplary display of a sequence of instant messages 300 on a display 400 associated with a computing device 220. Also shown, is a window from a word processor program 410.

Figure 5:
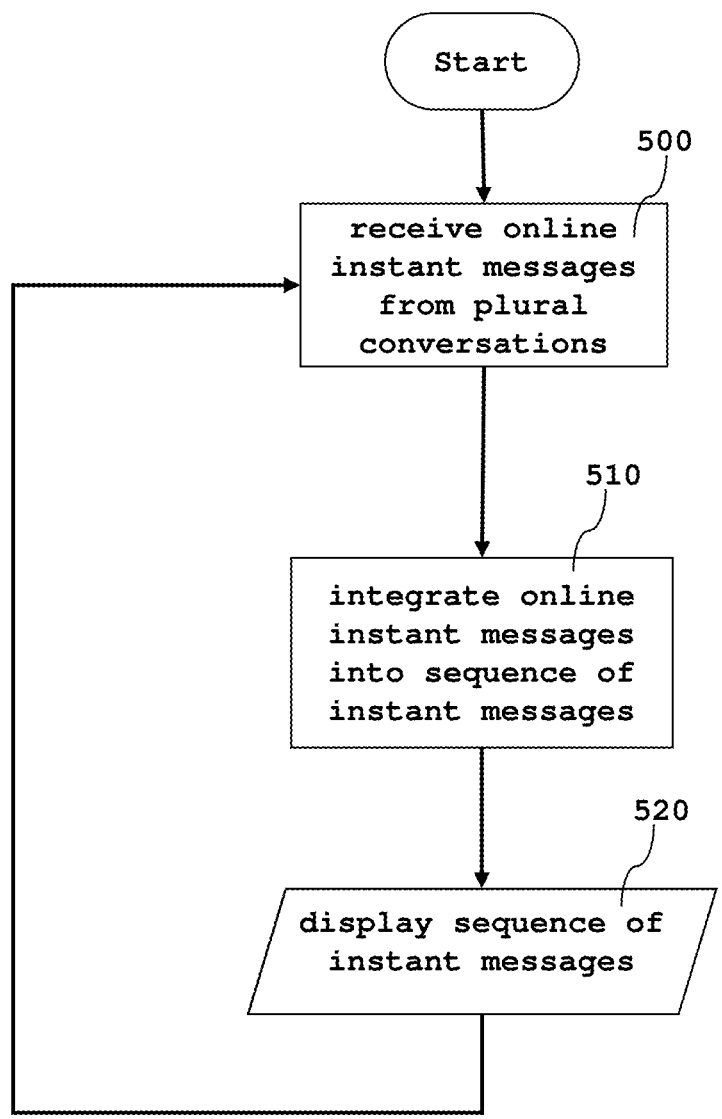
FIG. 5 is a flowchart showing method steps that can be executed in regards to a first sequence of instant messages.

FIG. 5 illustrates method steps that can be executed in regards to a sequence of instant messages 300. At step 500, an instant messaging application 100 receives online instant messages 304 from plural conversations 210. In step 500, a user 200 is a participant in each instant messaging conversation 210. In an alternative embodiment, online instant messages 304 from a first instant messaging conversation are received over a first Transmission Control Protocol (TCP) connection and online instant messages from a second instant messaging conversation are received over a second TCP connection. Step 500 is typically executed by the instant messaging application 100, but it could be executed by an application different from the instant messaging application 100. At step 510, the received online instant messages 304 are integrated into a sequence of instant messages 300. Step 510 is where presence notifications 302 and outgoing instant messages 306 can also be integrated into the sequence of instant messages 300. At step 520, the sequence of instant messages 300 is displayed on the display 400 associated with the computing device 220. In step 520, when the sequence of instant messages 300 is displayed, more recently received online instant messages 304 are displayed below less recently received online instant messages 304 in the plane of the display 400 (see FIG. 3a and FIG. 3b). The order in which the sequence of instant messages 300 is displayed can be reversed with more recently received online instant messages 304 displayed above less recently received online instant messages 304 in the plane of the display 400.

Figure 6:
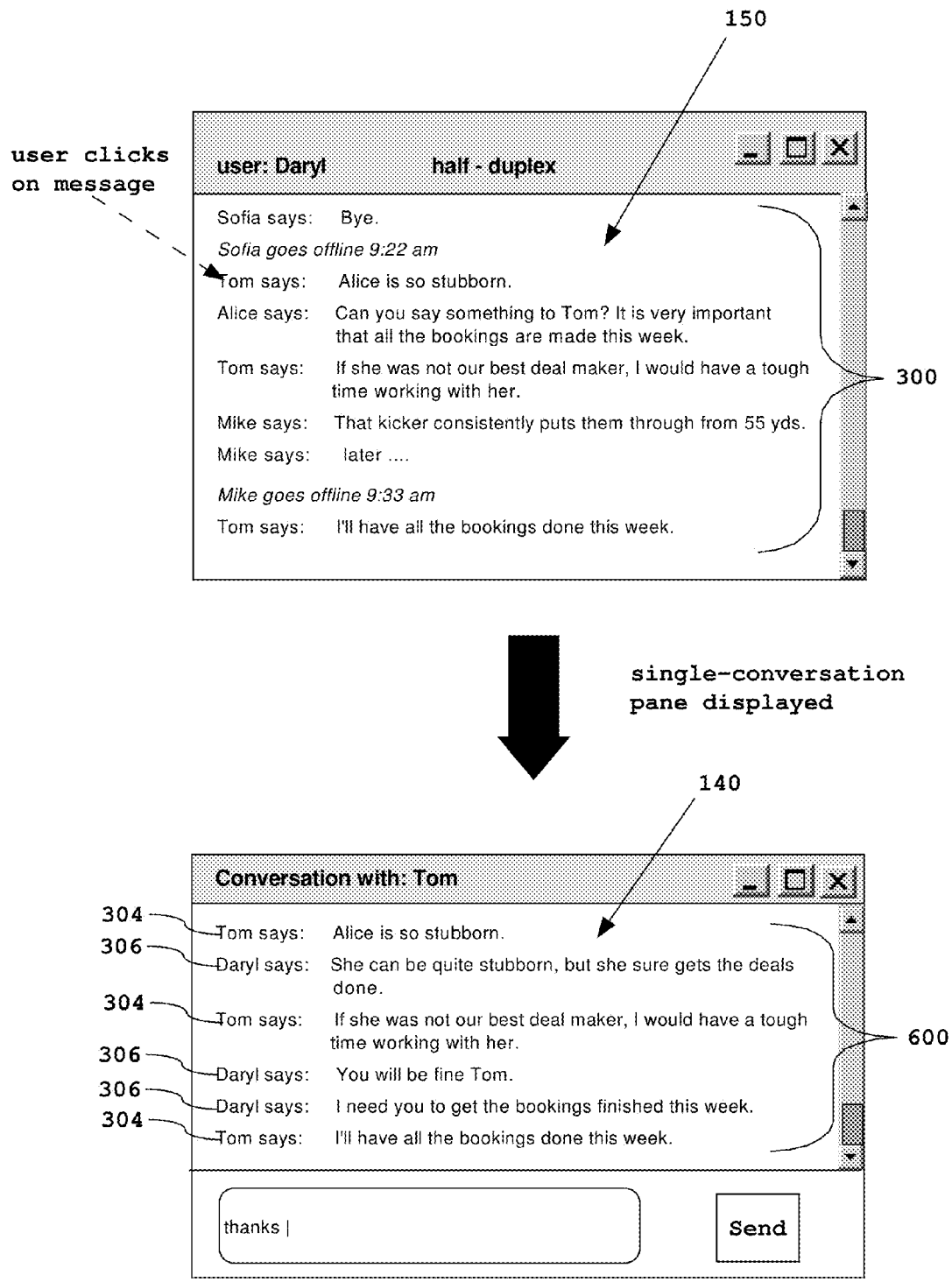
FIG. 6 illustrates how a second sequence of instant messages is displayed in response to user input directed at a displayed first sequence of instant messages.

FIG. 6 illustrates the display of a second sequence of instant messages 300 in response to the user 200 clicking on the displayed first sequence of instant messages 300. In this example, the user 200 has clicked on an online instant message 304 from Tom. As a result, a second sequence of instant messages relating to the user's 200 conversation with Tom is displayed. In FIG. 6, the first sequence of instant messages 300 is displayed half-duplex and the second sequence of instant messages 600 is displayed full duplex. The first sequence of instant messages 300 can also be displayed in full duplex. Another way to describe FIG. 6 is that the user 200 has clicked on an online instant message 304 from Tom in the multi-conversation pane 150 and in response to the user's 200 click, the single conversation pane 140 corresponding to Tom is displayed.

Figure 7:
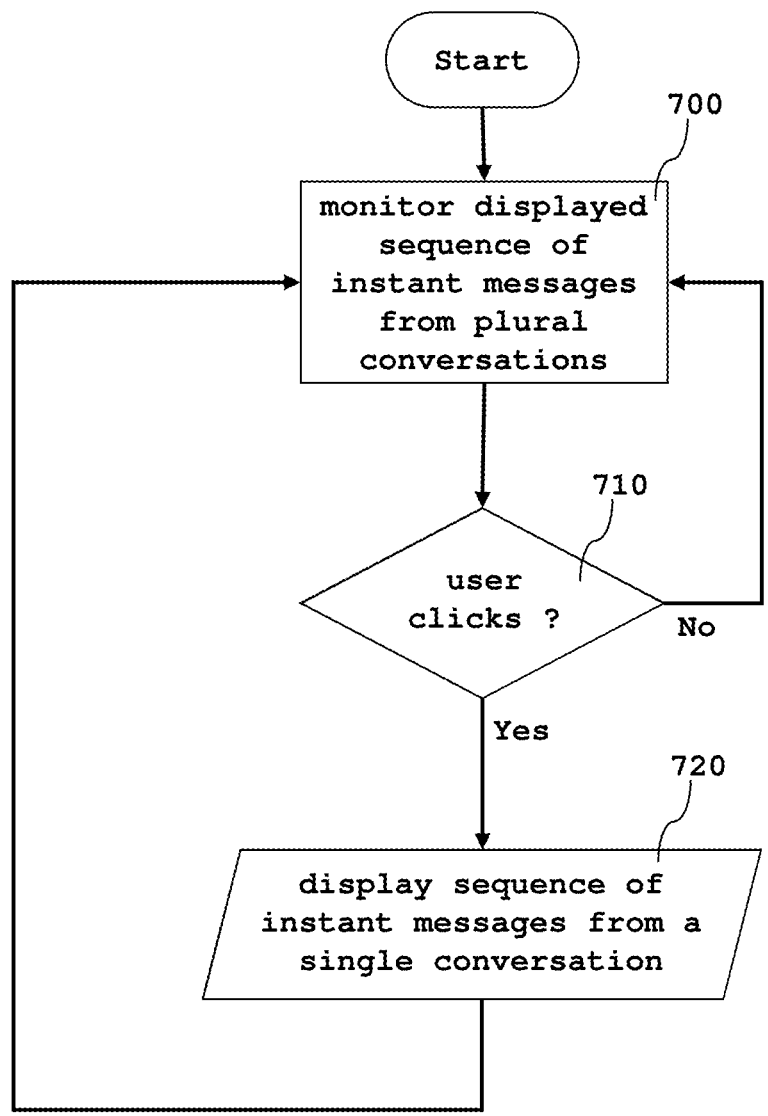
FIG. 7 is a flowchart showing an exemplary process for responding to user input directed at a displayed first sequence of instant messages.

FIG. 7 shows a flowchart of another set of method steps that can be executed regarding a sequence of instant messages 300. At step 700, the instant messaging application 100 monitors the displayed sequence of instant messages 300, such as the displayed sequence of instant messages 300 in FIG. 6. The monitoring of the displayed sequence of instant messages 300 detects user input. Any type of user input may be monitored and/or detected, such as, mouse clicks, keyboard entries, stylus entries, a finger touch on a touch screen, voice commands, and/or any other kind of user input. At step 710, it is determined if the user 200 has directed input at the displayed sequence of instant messages 300. If the user has not directed input at the displayed sequence of instant messages 300, the instant messaging application 100 continues monitoring at step 700. If the user has directed input at the displayed sequence of instant messages 300, then at step 720 a second sequence of instant messages 600 is displayed. The second sequence of instant messages 600 comprising instant messages from a single conversation 210. Alternatively, user input directed at the displayed first sequence of instant messages 300 could cause a contact list pane 130 to be displayed. In yet another embodiment, Step 720 can further comprise displaying an interim user interface element and then after user input directed at the interim user interface element, the second sequence of instant messages 600 can be displayed.

In a still further alternate embodiment the display of a sequence of instant messages 300 from plural instant messaging conversations 210 is provided by a separate application than the instant messaging application 100. The separate application can signal the instant messaging application 100 to display a sequence of instant messages 600 corresponding to a single conversation. The separate application can monitor the IP traffic on the computing device 220, filtering the IP traffic for instant messaging packets and displaying the sequence of instant messages 300 on the display 700. Other ways to monitor for instant messages are possible.

While various embodiments have been described above, it should be understood that they have been presented by way of example only, and not limitation. For example, any of the elements associated with the multi-conversation pane may employ any of the desired functionality set forth hereinabove. Thus, the breadth and scope of a preferred embodiment should not be limited by any of the above-described exemplary embodiments.

I claim:

1. A method implemented in an application executing on a computing device associated with a user, the method facilitating multiple simultaneous instant messaging conversations, the method comprising:

receiving a first online instant message from a first instant messaging conversation, the user a participant in the first instant messaging conversation;

receiving a second online instant message from a second instant messaging conversation, the user a participant in the second instant messaging conversation;

receiving a third online instant message;

integrating the first online instant message and the second online instant message and the third online instant message into a first sequence of instant messages;

displaying the first sequence of instant messages in a first window on a display associated with the computing device, the displaying such that more recently received instant messages are displayed one of below and above less recently received instant messages, in the plane of the display and wherein the displaying is such that each of the first online instant message, the second online instant message, and the third online instant message are visible and wherein the displaying is such that the displayed first sequence of instant messages is scrollable by the user; and responsive to a mouse click directed at the displayed first sequence of instant messages and without requiring further user input, displaying a second sequence of instant messages in a second window on the display, the second sequence of instant messages primarily comprising plural instant messages from the first instant messaging conversation and wherein the displaying of the second sequence of instant messages is such that more recently received instant messages are displayed one of below and above less recently received instant messages, in the plane of the display and wherein the displaying of the second sequence of instant messages in the second window is such that the displayed first sequence of instant messages in the first window is also visible.

2. A method for helping a user of a computing device participate in multiple simultaneous instant messaging conversations, the method implemented by first and second application programs executing on the computing device, the method comprising:

receiving, by the first application program, a first online instant message from a first instant messaging conversation, the user a participant in the first instant messaging conversation;

receiving, by the first application program, a second online instant message from a second instant messaging conversation, the user a participant in the second instant messaging conversation;

receiving, by the first application program, a third online instant message;

integrating, by the first application program, the first online instant message and the second online instant message and the third online instant message into a first sequence of instant messages;

displaying, by the first application program, the first sequence of instant messages in a first window on a display associated with the computing device, the displaying such that more recently received instant messages are displayed one of below and above less recently received instant messages, in the plane of the display and wherein the displaying is such that each of the first online instant message, the second online instant message, and the third online instant message are visible and wherein the displaying is such that the displayed first sequence of instant messages is scrollable by the user;

responsive to a mouse click directed at the first online instant message in the displayed first sequence of instant messages and without requiring further user input, signaling the second application program from the first application program and wherein the second application program is different from the first application program; and responding, by the second application program, to the signaling, from the first application program by displaying a second sequence of instant messages in a second window on the display, the second sequence of instant messages primarily comprising plural instant messages from the first instant messaging conversation and wherein the displaying of the second sequence of instant messages is such that more recently received instant messages are displayed one of below and above less recently received instant messages, in the plane of the display and wherein the displaying of the second sequence of instant messages in the second window is such that the displayed first sequence of instant messages in the first window is also visible.

3. A method implemented in an application executing on a computing device associated with a user, the method facilitating multiple simultaneous instant messaging conversations, the method comprising:

receiving a first online instant message from a first instant messaging conversation, the user a participant in the first instant messaging conversation;

receiving a second online instant message from a second instant messaging conversation, the user a participant in the second instant messaging conversation;

receiving a third online instant message;

integrating the first online instant message and the second online instant message and the third online instant message into a first sequence of instant messages;

displaying the first sequence of instant messages in a first window on a display associated with the computing device, the displaying such that more recently received instant messages are displayed one of below and above less recently received instant messages, in the plane of the display and wherein the displaying is such that each of the first online instant message, the second online instant message and the third online instant message are visible and wherein the displaying is such that the displayed first sequence of instant messages is scrollable by the user; and responsive to a finger touch directed at the displayed first sequence of instant messages and without requiring further user input, displaying a second sequence of instant messages in a second window on the display, the second sequence of instant messages primarily comprising plural instant messages from the first instant messaging conversation and wherein the displaying of the second sequence of instant messages is such that more recently received instant messages are displayed one of below and above less recently received instant messages, in the plane of the display and wherein the displaying of the second sequence of instant messages in the second window is such that the displayed first sequence of instant messages in the first window is also visible.

\* \* \* \* \*